United States Patent [19]
Sekiguchi

[11] 3,913,983
[45] Oct. 21, 1975

[54] MODULATOR FOR USE IN AIR BRAKE SYSTEM WITH ANTI-SKID DEVICE

[75] Inventor: Yukichi Sekiguchi, Saitama, Japan

[73] Assignee: Sanwa Seiki Mfg. Co. Ltd., Yono, Japan

[22] Filed: Jan. 13, 1974

[21] Appl. No.: 540,465

[52] U.S. Cl. .................................. 303/21 F; 303/61
[51] Int. Cl.² ........................................... B60T 8/00
[58] Field of Search ................... 188/181 A, 181 R; 303/21 CE, 21 CF, 21 CG, 21 F, 21 FS, 21 FM, 61

[56] References Cited
UNITED STATES PATENTS

| | | | |
|---|---|---|---|
| 3,749,125 | 7/1973 | Peruglia et al. | 303/21 FS |
| 3,813,130 | 5/1974 | Inada | 303/21 FM |
| 3,847,449 | 11/1974 | Adahan | 303/61 X |
| 3,866,982 | 2/1975 | Geier et al. | 303/21 FM |

*Primary Examiner*—Duane A. Reger
*Attorney, Agent, or Firm*—Pollock, Philpitt & Vande Sande

[57] ABSTRACT

The invention discloses a modulator for use with an air brake system with an anti-skid device, which modulator comprises, in general, a solenoid controlled two port connection valve, a passage with a restrictor bypassing the two port connection valve, and a solenoid controlled three port connection valve whose intake port is communicated with both the outlet ports of the two port connection valve and the bypass passage. When no control signal is received from an computer when a brake pedal is depressed, the compressed air flows through both the two port connection valve and the bypass passage into the three port connection valve so that the actuator pressure may be increased at a faster rate in order to compensate the time lag until the actuator pressure reaches a predetermined level immediately below the set point at which the computer generates the pressure release signal. When the actuator pressure reaches the predetermined level, the computer generates the throttle signal in response to which the two port connection valve is closed so that only a small quantity of compressed air flows through the bypass passage into the three port connection valve. Thus the actuator pressure may be increased at a slow rate in order to minimize the overshooting which results in dangerous skidding. After the actuator pressure exceeds the set point, the three port connection valve is so actuated as to release the actuator pressure into the surrounding atmosphere in a conventional manner.

1 Claim, 7 Drawing Figures

MODULATOR FOR USE IN AIR BRAKE SYSTEM WITH ANTI-SKID DEVICE

BACKGROUND OF THE INVENTION

The present invention relates to generally an automotive air brake system with an anti-skid device, and more particularly a modulator for use in an air brake system with an antiskid device, and has for its object to provide a modulator which may be effectively shorten the brake stopping distance in a reliable and safe manner without causing skidding.

In general, the slip ratio S (%) of an automotive vehicle is given by $$S = (1 - W/V) \times 100 \%$$

where

V : vehicle speed; and

W : wheel speed.

When $S = 100$, the braking force is too excessive so that the wheels are locked, resulting in dangerous skidding. On the other hand, when $S = O$, there is no slip between the wheels and the road surface, but the brake stopping distance is considerably increased. In general, when the slip ratio S is approximately 20%, the optimum brake efficiency which ensures no dangerous skidding and a shorter brake stopping distance, is attained.

In the conventional automotive air brake systems with an anti-skid device, the modulator controls the actuator pressure in response to the control signals from the computer depending upon the vehicle speed and the wheel speed. However, there exists a time lag between the time when the control signal from the computer changes to the time when the actuator pressure is actually changed in response to this signal. When the actuator pressure is increased at a fast rate in order to compensate the time lag, the overshooting or rise of the actuator pressure above the set point occurs so that too strong braking force is applied, resulting in skidding. On the other hand, when the actuator pressure is increased at a slower rate in order to avoid the overshooting and hence the skidding, the sufficient braking force is not provided so that the brake stopping distance is inevitably increased.

SUMMARY OF THE INVENTION

The present invention was made in order to overcome the above and other defects encounted in the prior art automotive air brake system with an anti-skid device. Briefly stated, the present invention provides a modulator for air brake systems of the type which permits to increase the actuator pressure at a faster rate in order to compensate the time lag until it reaches a predetermined level immediately below a set point, and then to increase the actuating pressure at a slower rate in order to minimize the overshooting due to the faster actuator pressure increase. After the actuator reaches the set point, it is released. When a brake pedal is applied, the above three actuator control steps by the modulator are cycled in response to the control signals from the computer so that skidding may be positively prevented while the brake stopping distance may be considerably shortened.

The modulator in accord with the present invention comprises, in general, a solenoid controlled two port connection valve, a bypass passage with a restrictor inserted in parallel with the two port connection valve, for bypassing the compressed air flow when the two port connection valve is closed, and a solenoid controlled three port connection valve communicated with the outlet ports of the two port connection valve and the bypass passage. When no control signal is received from a computer when a brake pedal is depressed, both the two port and three port connection valves are deenergized so that the compressed air flows both through the two port connection valve and the bypass passage into the three port connection valve, from which it flows into the actuators. Therefore the actuator pressure may be increased at a relatively fast rate in order to compensate the time lag. When the actuator pressure exceeds a predetermined level immediately below the set point, the computer generates the throttle signal in response to which the two port connection valve is energized to close itself. As a result, only a small quantity of compressed air is permitted to flow through the bypass passage with the restrictor into the three port connection valve so that the actuator pressure may be now increased at a relatively slow rate in order to prevent the overshooting which results in skidding. When the actuator pressure reaches the set point, the computer generates the pressure release signal in response to which the three port connection valve is energized to release the actuator pressure into the surrounding atmosphere.

The above and other objects, features and advantages of the present invention will become more apparent from the following description of the preferred embodiment thereof taken in conjunction with the accompanying drawing.

DESCRIPTION OF THE PREFERRED EMBODIMENT

Figure 1:
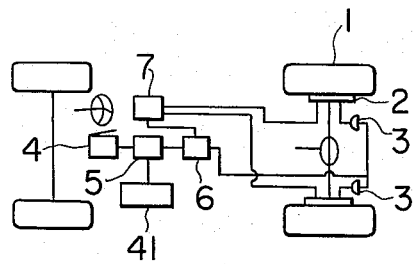
FIG. 1 is a diagrammatic view of an automotive air brake system with an anti-skid device incorporating a modulator in accordance with the present invention.
Figure 2:
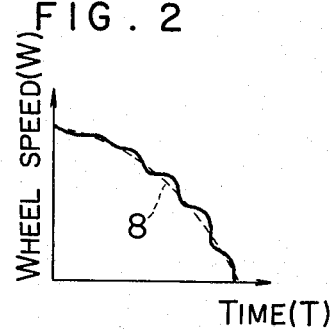
FIGS. 2, 3 and 4 are diagrams used for the explanation of the mode of operation thereof.

Prior to the description of a preferred embodiment of a modulator in accordance with the present invention for use in an automotive air brake system with an antiskid device, the conventional air brake system will be briefly described with reference to FIG. 1. When a brake valve 4 is depressed or released, the compressed air flows from a reservoir 14 through a relay valve 5 and a modulator 6 into an actuator 3 for actuating a brake mechanism in a brake drum 2 attached to a wheel 1 or the compressed air is released from the actuator 3. In response to the control signal from a computer 7, the modulator 6 controls the actuator pressure to increase or decrease so that the slip ratio may be maintained approximately 20 % regardless of the vehicle speed and the wheel speed. Therefore, in the ideal case, the wheel speed w is gradually decreased along the curved line 8 shown in FIG. 2 along which the slip ratio is maintained at 20 %.

Figure 3:
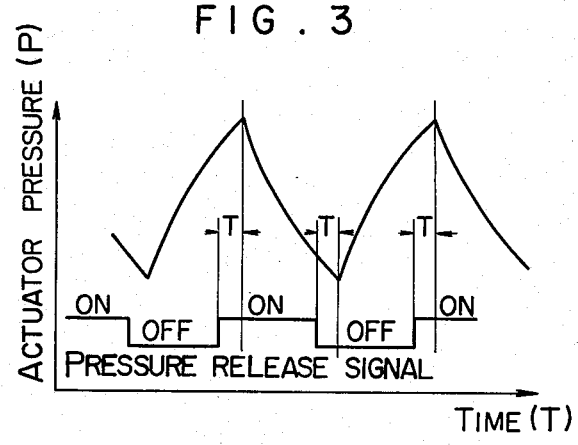

As described above, in response to the electrical signals from the computer 7, the modulator 6 increases or decreases the actuator pressure. That is, as shown in FIG. 3, in response to ON signal the modulator 6 is so actuated as to decrease the actuator pressure while in response to OFF signal, it is so actuated as to increase the actuator pressure. However, there exists a time lag T from the time when the control signal changes from ON to OFF or from OFF to ON to the time when the actuator pressure changes so that the actuator pressure very frequently tends to increase or decrease too much. As a consequence, skidding occurs as the wheels are locked or the braking force is decreased too much.

Figure 4:
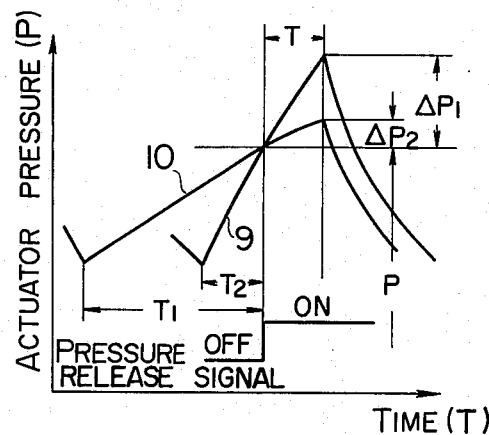

As described above, there exists a time lag T as shown in FIG. 4 from the time when the actuator pressure reaches a set pressure P so that the pressure release or ON signal is generated until the time when the release of the actuator pressure is started. When the actuator pressure is increased at a faster rate as shown by the curve 9 in FIG. 4, the overshooting or excessive pressure $\Delta P_1$ becomes too high. However, when the actuator pressure is increased at a relatively slow rate as indicated by the curve 10 in FIG. 4, the overshooting or excessive pressure $\Delta P_2$ becomes less. When the actuator pressure is increased at a slow rate, the time $T_1$ required for the actuator pressure to reach the set point P becomes considerably longer than the time $T_2$ required when the actuator pressure is increased at a faster rate. This means that the brake stopping distance is increased. Thus, it is not preferable to increase the actuator pressure at a slower rate.

THE INVENTION

Figure 5:
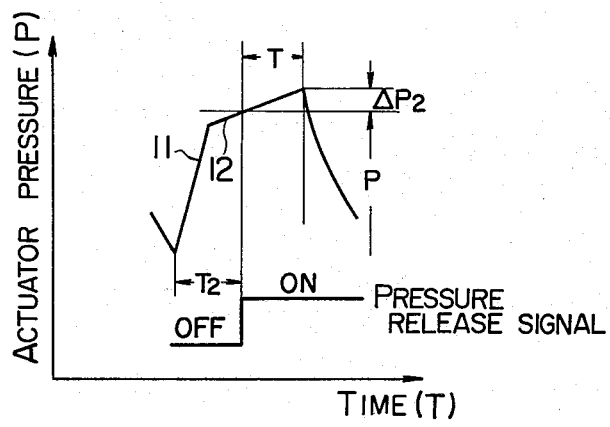
FIG. 5 is a diagram used for the explanation of the mode of operation of a modulator in accordance with the present invention.

Briefly stated, according to the present invention, the actuator pressure is increased at a fast rate along the steep pressure curve 11 shown in FIG. 5 until the actuator pressure reaches a predetermined level immediately below the set point P but when the actuator pressure exceeds this predetermined level, it is increased at a slower rate along the curve 12 shown in FIG. 5 until it reaches the set point P. In other words, the modulator 6 in accordance with the present invention controls the actuators 3 in response to the two control signals from the computer 7 so that the actuator pressure may be increased first at a faster rate, then at a slower rate, and thereafter may be released or decreased as indicated in FIG. 5.

Figure 6:
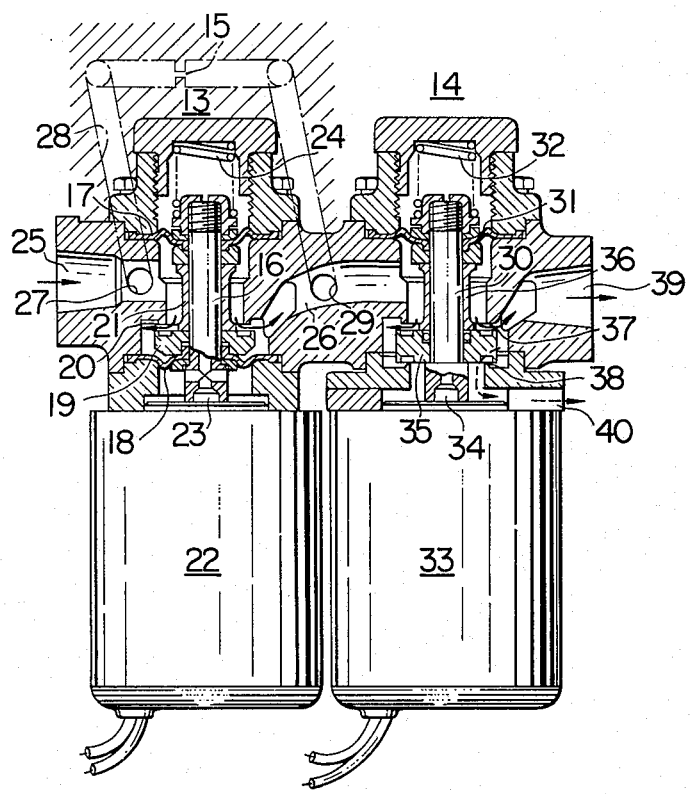
FIGS. 6 and 7 are a longitudinal sectional view and a top view of a modulator in accordance with the present invention.
Figure 7:
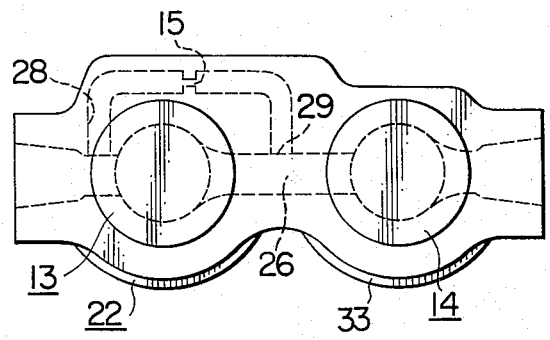

Next referring to FIGS. 6 and 7, the preferred embodiment of the present invention will be described in detail hereinafter. The modulator generally indicated by the reference numeral 6 in FIG. 1 comprises, in general, a solenoid controlled two port connection valve 13, a solenoid controlled three port connection valve 14, and a restrictor 15.

In the two port connection valve 13, reference numeral 16 denotes a valve rod air-tightly attached to an upper diaphragm 17 and a lower diaphragm 18 and provided with a valve 19 made of rubber; 20, a valve seat; 21, a spacer; and 22, a solenoid which, when energized, causes a plunger 23 to push the valve rod 16 upwardly so that the valve 19 may be firmly pressed against the valve seat 20. When the solenoid 22 is deenergized, the valve rod 16 is lowered under the force of a biase spring 24 so that the valve 19 is spaced apart from the valve seat 20. As a result, a compressed air intake port 25 is communicated through the two port connection valve 13 with a communication passage 26 which in turn communicates the two port connection valve 13 with the three port connection valve 14. A bypass passage 28 with a restrictor 15 inserted at the mid point has its one port 27 opened into the intake port 25 and its the other port 29 opened into the communication passage 26.

The three port connection valve 14 comprises a valve rod 30 which is attached to a diaphragm 31 and is normally biased downwardly under the force of a spring 32 so that the lower end of the valve rod 30 is made into contact with a plunger 34 of a solenoid 33. The valve rod 30 is slidably fitted into a spacer 36, and is provided with a valve 35 at the lower end portion thereof. The upper and lower valve surfaces of the valve 35 for contact with an upper valve seat 37 and a lower valve seat 38 are attached with rubber. When the valve 35 is pressed against the upper valve seat 37, the communication between the passage 26 and an outlet port 39 is interrupted, but the communication between the outlet port 39 and a discharge port 40 is established. When the valve 35 is moved away from the upper valve seat 37 and is pressed against the lower valve seat 38, the discharge port 40 is closed and the passage 26 and the outlet port 39 are intercommunicated.

Next the mode of operation will be described. Assume that both the solenoid coils 22 and 33 are deenergized so that the valves 19 and 35 are positioned as shown in FIG. 6. When a driver depresses a brake pedal to open the brake valve 4, the compressed air flows from the intake port through the space between the valve 19 and the valve seat 20 in the two port connection valve 13 into the passage 26 while some of the compressed air flows through the port 27, the bypass passage 28, the restrictor 15, and the port 29 into the passage 26. In the passage 26, the compressed air stream passing through the two port connection valve 13 and the compressed air stream passing through the bypass passage 28 are joined to flow through the space between the upper valve seat 37 and the valve 35 and the outlet port 39 into the actuator 3. Thus the actuator pressure is increased at a faster rate along the curve 11 shown in FIG. 5.

When the actuator pressure approaches the set point P; that is, when it exceeds a predetermined level below the set point P, the computer 7 generates the throttle signal, in response to which the coil 22 is energized so that the plunger 23 forces the valve rod 16 upwardly against the spring 24. The valve 19 is pressed against the valve seat 20 so the two port connection valve 13 is closed. As a result, the compressed air flows only through the bypass passage 28 into the passage 26. That is, the compressed air whose flow rate is limited by the restrictor 15 in the bypass passage 28, flows into the actuators through the three port connection valve 14. As a result, the actuator pressure is increased at a slower rate along the curve 12 shown in FIG. 5.

When the actuator pressure reaches the set point P, the computer 7 generates the pressure release signal, in response to which the coil 33 is energized so that the valve rod 30 and hence the valve 35 are forced upwardly against the spring 32 by the plunger 34. As a consequence, the communication between the passage 26 and the outlet port 39 is interrupted while the communication between the outlet port 39 and the discharge port 40 is established so that the actuator pressure is released into the surrounding atmosphere. The above braking operation steps; that is, the fast actuator pressure increase step, the slower actuator pressure increase step, and the actuator pressure release step are cycled as far as the brake pedal is depressed so that the vehicle speed may be gradually decreased along the optimum wheel speed deceleration curve 8 shown in FIG. 2 with the slip ratio being optimumly maintained at 20 %.

In the modulator 6 with the above construction, both the valve rods 16 and 30 are attached with the diaphragms 17, 18 and 31, respectively. In other words, they have no mating part with which they are made into sliding contact. Therefore, the rapid reciprocal stroke of the valve rods 16 and 30 may be ensured. Furthermore, the air-tightness is secured so that even when the pressure changes, the valve rods 16 and 30 are well balanced and securely held vertically. For this purpose, the effective diameters of the diaphragms 17, 18 and 31 are selected equal to those of the valve seats 20 and 37 and 38, respectively.

With the modulator with the above construction, the flow of the compressed air to and from the actuator may be so controlled in response to the throttle signal and the pressure release signal from the computer that the sufficient braking force may be provided without causing skidding. Thus, the air brake system incorporating the modulator of the present invention is highly reliable in operation, and the brake stopping distance may be considerably shortened.

What is claimed is
1. A modulator for use with an air brake system with an anti-skid device comprising
 a. a solenoid controlled two port connection valve (13) in which a valve rod (16) which is carried by an upper diaphragm (17) and a lower diaphragm (18) vertically spaced apart from each other by a predetermined distance, provided with a valve member (19) interposed between said upper and lower diaphragms, and is biased in the axial direction thereof under the force of a bias spring (24), is made into engagement with a plunger coaxially thereof of a solenoid coil (22);
 b. a bypass passage (28) with a restrictor (15) for bypassing said two port connection valve by intercommunicating between an intake port (25) and an outlet port or passage (26) of said two port connection valve; and
 c. a solenoid controlled three port connection valve (14) in which a valve rod (30) with a valve (35) interposed between an upper valve seat (37) and a lower valve seat (38) is carried by a diaphragm (31) and is biased in the axial direction thereof under the force of a spring (32) so as to be made into engagement with a plunger of a solenoid coil (33), whereby when said valve (35) is displaced, the communication among an outlet port (39), said passage (26), and a discharge port (40) may be established or interrupted.

* * * * *

UNITED STATES PATENT AND TRADEMARK OFFICE
CERTIFICATE OF CORRECTION

PATENT NO. : 3,913,983
DATED : October 21, 1975
INVENTOR(S) : Yukichi Sekiguchi

It is certified that error appears in the above-identified patent and that said Letters Patent are hereby corrected as shown below:

In the heading, the filing date shown as

January 13, 1974 should be January 13, 1975.

Signed and Sealed this ninth Day of March 1976

[SEAL]

Attest:

RUTH C. MASON
*Attesting Officer*

C. MARSHALL DANN
*Commissioner of Patents and Trademarks*